United States Patent [19]
Smith

[11] 3,904,024
[45] Sept. 9, 1975

[54] APPARATUS FOR TRANSFERRING OBJECTS

[75] Inventor: Frank L. Smith, Bowling Green, Ohio

[73] Assignee: Huss Equipment Corporation, Toledo, Ohio

[22] Filed: Jan. 21, 1974

[21] Appl. No.: 434,890

[52] U.S. Cl. ............... 198/119; 198/122; 198/125; 214/66
[51] Int. Cl.² .......................................... B65G 21/12
[58] Field of Search ................. 198/117–120, 198/121–125; 214/66

[56] References Cited
UNITED STATES PATENTS

| | | | |
|---|---|---|---|
| 1,617,490 | 2/1927 | Knox | 198/125 |
| 2,631,715 | 3/1953 | Vickers | 198/118 |
| 3,169,630 | 2/1965 | Christiansen | 198/119 |
| 3,512,669 | 5/1970 | Benedict et al. | 198/120 |
| 3,581,874 | 6/1971 | Keith | 198/121 |
| 3,717,263 | 2/1973 | McWilliams | 198/119 |
| 3,779,404 | 12/1973 | McWilliams | 198/122 |

Primary Examiner—Evon C. Blunk
Assistant Examiner—Jeffrey V. Nase
Attorney, Agent, or Firm—Allen D. Gutchess, Jr.

[57] ABSTRACT

Apparatus for moving objects and particularly for transferring objects from one location to another is provided. More specifically, the apparatus is designed to facilitate the transfer of objects to or from a plurality of stacks of them. The apparatus includes an elongate belt conveyor having means for moving the belt in either direction. The belt conveyor is pivotally supported at a first end about a vertical axis so that a second end can be moved in a horizontal, arcuate path from one stack of the objects to another. The belt conveyor also is pivotally supported at the first end about a horizontal axis so that the second end can be moved in a vertical, arcuate path between a lower position in which the second end is located near the bottom of the stack and an upper position in which the second end is located near the top of the stack. Means are provided toward the second end for moving the second end in the vertical path, with this moving means being designed such that in the lower position of the second end of the conveyor, it is at a level below the position of the first end of the conveyor. Means are also provided toward the second end of the conveyor for guiding that end in the horizontal, arcuate path, with this means being supported by the vertical moving means.

12 Claims, 8 Drawing Figures

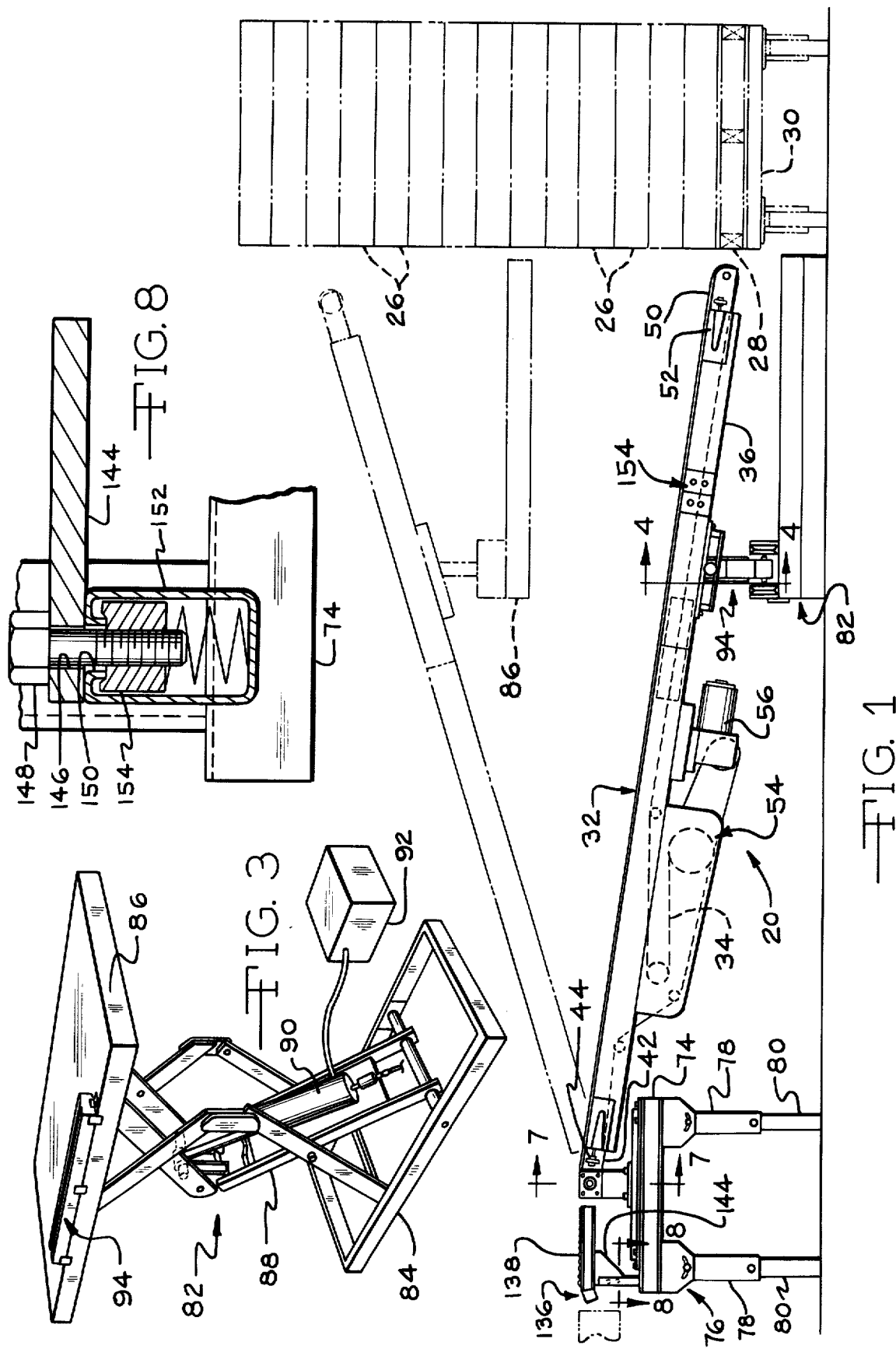

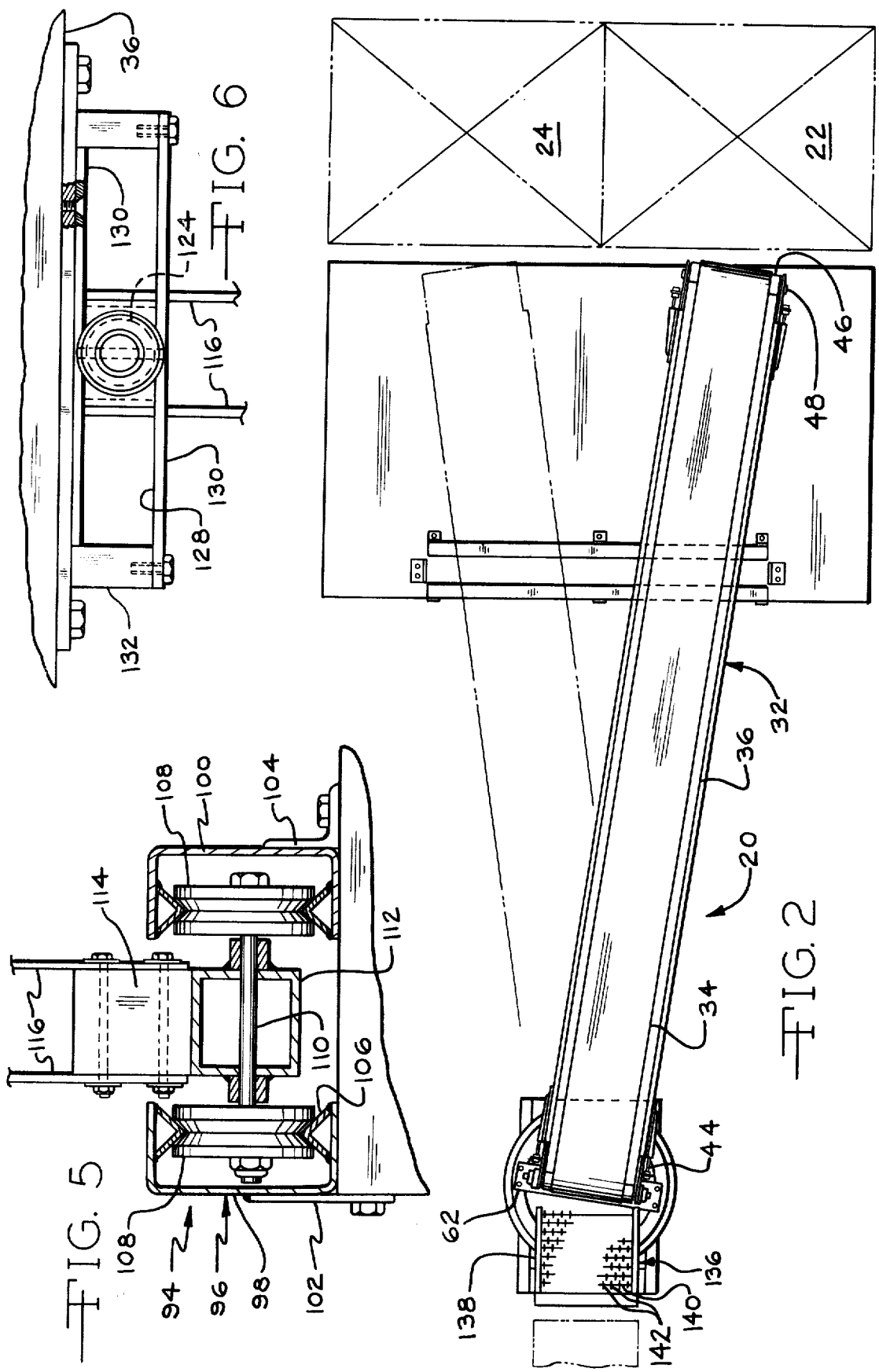

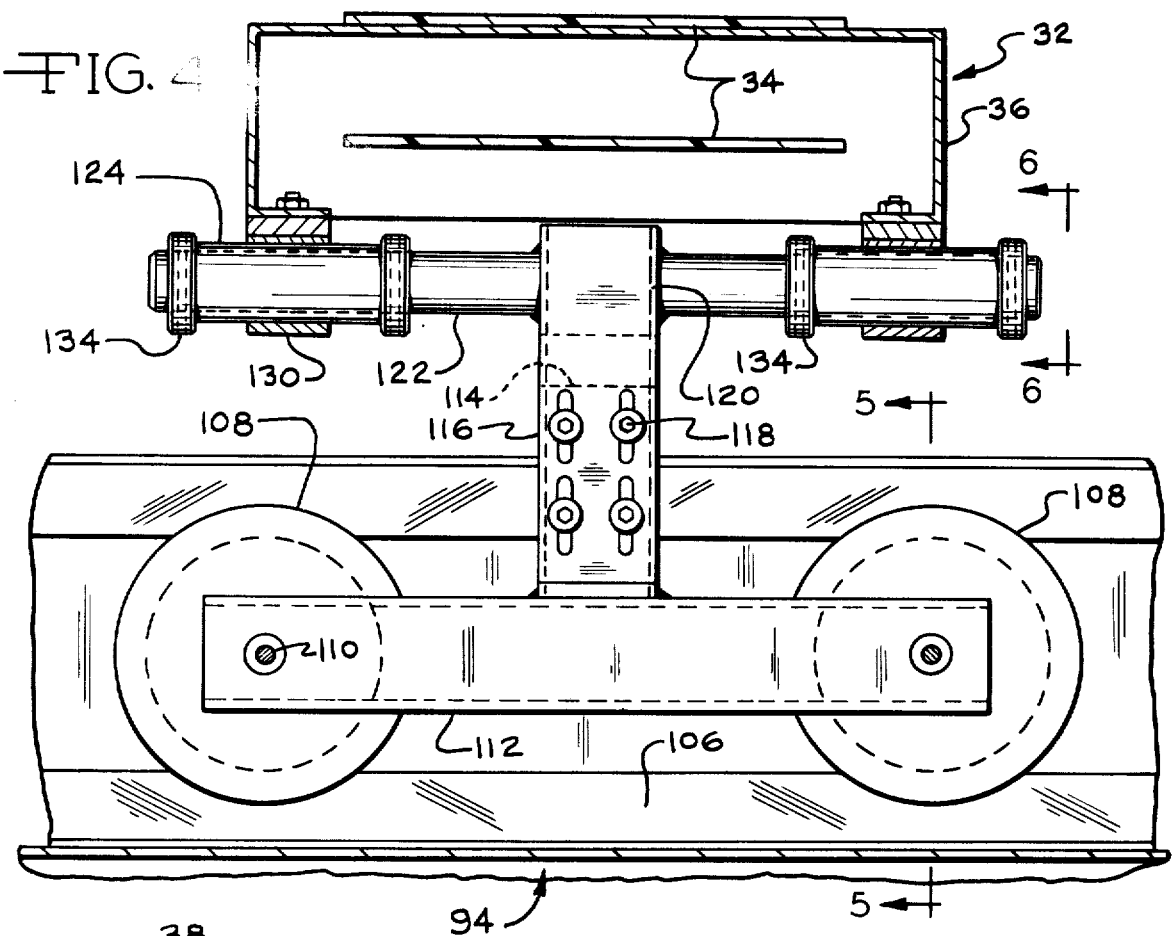
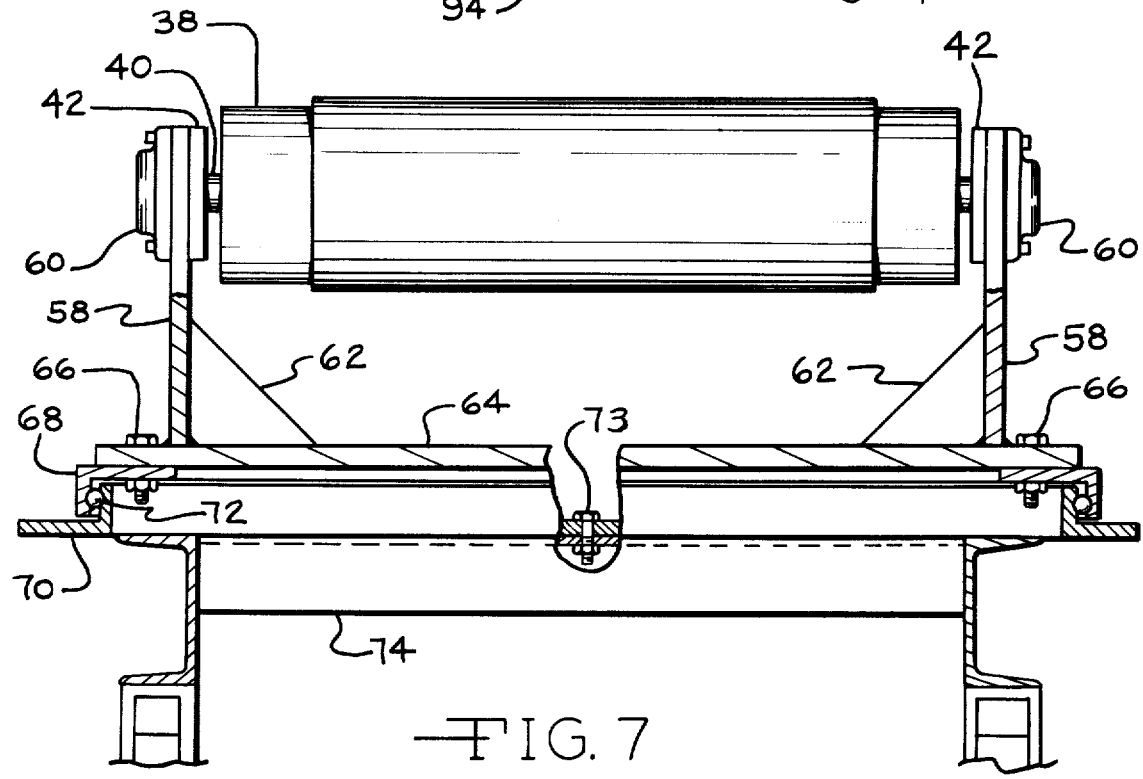

APPARATUS FOR TRANSFERRING OBJECTS

This invention relates to apparatus for moving objects, and particularly to apparatus for moving objects to and from stacks thereof.

The invention is particularly designed to facilitate the transfer of objects to or from stacks of them which are located on pallets. Heretofore, various handling means have been known for facilitating the movement of such stacks. However, such apparatus has been very high in cost so that the manufacturer was faced either with a high capital cost or a high labor cost for laborers involved in transferring the objects entirely by hand.

The present invention provides an improved apparatus for handling objects located in stacks such as on pallets, with the apparatus being relatively low in cost. The objects can be handled by one operator in a rapid manner with the result that neither high capital costs nor high labor costs are incurred.

The apparatus includes a belt conveyor with an endless belt which can be moved in either direction to move objects toward or away from the stacks. The belt conveyor has a first end pivotally mounted about a vertical axis so that a second, opposite end of the conveyor can be swung in a generally horizontal direction from one stack to another. The first end of the conveyor is also pivotally supported about a horizontal axis so that the second end can be moved in a generally vertical direction, whereby that end can be placed either near the top or the bottom of the stack or at any position therebetween. A platform is located toward the second end of the conveyor on which a portion of the conveyor is supported and guided for movement in the horizontal path, with the operator also having room to stand on the platform to transfer objects between the second end of the conveyor and the stack. Vertical moving means for the conveyor includes a scissors linkage which raises and lowers the platform and the second end of the conveyor. The linkage requires a minimum of space so that the lowest position of the second end of the conveyor can be below the level of the first end of the conveyor.

It is, therefore, a principal object of the invention to provide apparatus for facilitating the transferring of objects from and to stacks thereof.

Another object of the invention is to provide such apparatus which is lower in cost and reduces the amount of labor required.

A further object of the invention is to provide a belt conveyor, one end of which is pivotally supported about both horizontal and vertical axes so that the second end can be moved both horizontally and vertically, between stacks of material and between the top and bottom of a stack.

Many other objects and advantages of the invention will be apparent from the following detailed description of a preferred embodiment thereof, reference being made to the accompanying drawings, in which:

FIG. 1 is a somewhat schematic side view in elevation of apparatus according to the invention adjacent stacks of objects;

FIG. 2 is a somewhat schematic plan view of the apparatus and stacks of FIG. 1;

FIG. 3 is a somewhat schematic view in perspective of apparatus for moving an end of the conveyor in a generally vertical path and for guiding the end thereof in a horizontal path;

FIG. 4 is an enlarged view in vertical section, taken along the line 4—4 of FIG. 1;

FIG. 5 is a fragmentary view in vertical section, taken along the line 5—5 of FIG. 4;

FIG. 6 is a fragmentary view in elevation, taken along the line 6—6 of FIG. 4;

FIG. 7 is an enlarged, fragmentary view in section, taken along the line 7—7 of FIG. 1; and FIG. 8 is an enlarged, detailed, fragmentary view in section, taken along the line 8—8 of FIG. 1.

Referring to the drawings, and particularly to FIGS. 1 and 2, apparatus indicated at 20 is employed to facilitate transfer of objects to and from two stacks thereof schematically indicated at 22 and 24 (FIG. 2). Each of the stacks includes a plurality of layers 26 (FIG. 1), of the objects, with each layer containing nine of them, by way of example. The stacks are on pallets 28 located on a truck or cart 30, or other suitable support. The objects in the layers 26 can be transferred away from the stacks 22 and 24 by the apparatus 20 and be processed, after which they can be returned by the apparatus to the stacks 22 and 24 and taken to other operations or processes. A common use of the apparatus is in connection with glass bottles received in pallet loads, which bottles are subsequently processed, as by being filled, by way of example. In such an instance, each of the objects in the layers 26 would comprise a tray or rack containing a number of the bottles.

The apparatus 20 includes a belt conveyor 32 which has an endless belt 34 mounted on a box-like frame 36. A tail pulley 38 (FIG. 7) is mounted on a shaft 40 rotatably carried by extensions 42 connected by belt alignment mechanisms 44 (FIG. 1) to the frame 36. The second end of the belt 34 is carried on a head pulley 46 (FIG. 2) having a shaft 48 rotatably mounted in extensions 50 connected to the frame 36 by alignment mechanisms 52. A suitable belt take-up, generally indicated at 54, is located below the frame 36 along with a reversible drive motor 56 which can move the belt 34 in either direction.

The first end of the conveyor 32 is pivotally mounted about a horizontal axis to enable the other opposite or second end of the conveyor to move in a generally vertical, arcuate path. For this purpose, referring to FIG. 7, a pair of vertical bars 58 extend upwardly outside the conveyor extensions 42 and have suitable bearing members 60 which receive the ends of the tail pulley shaft 40. The upright bars 58 have braces 62 for further support, with both being affixed, as by welding, to a horizontal plate 64.

The first end of the conveyor 32 is also pivotally mounted about a vertical axis to enable the opposite or second end of the conveyor to move in a generally horizontal, arcuate path for movement between the stacks 22 and 24. For this purpose, again referring to FIG. 7, the plate 64 is affixed, as by bolts 66, to an upper bearing ring 68 rotatably supported on a lower base ring 70 through bearings 72. The supporting bars 58 support the tail pulley shaft 40 on a line extending through the center of rotation of the bearing ring 68 so that both the horizontal and vertical pivotal axes for the conveyor 32 intersect one another at a common point. The base ring 70 is affixed, as by bolts 73 to an upper frame 74 of a supporting table 76. The frame 74 is located on upper and lower telescoping legs 78 and 80 to enable the height of the frame 74 to be adjusted, if desired.

To enable the second end of the conveyor 32 to move in a vertical, arcuate path about the horizontal axis at the first end, a hydraulic lift or moving means 82, shown in FIG. 3 in particular, is provided. The hydraulic lift 82 is a commercially-available unit and will not be discussed in detail. It includes a supporting base 84 and a platform 86 which, when the lift 82 is in the lower, retracted position, is contiguous with the base 84, as shown in FIG. 1. The lift 82 thereby consumes a minimum amount of vertical space when retracted so that the second or movable end of the conveyor 32 is below the level of the first or pivoted end when in the lower position. This enables the second end to be down at approximately the level of the pallet 28 so that even the objects in the lowest layer 26 of the stacks 22 and 24 will be at about the level of the conveyor belt 34. This minimizes the effort required by the operator to transfer objects between the layers 26 and the belt 34. A scissors linkage 88 is connected between the base 84 and the platform 86 to move the platform 86 from the lowest position contiguous with the base 84 to a maximum extended or upper position, as indicated in dotted lines in FIG. 1. A hydraulic ram 90 provides the power for the movement, with hydraulic fluid under pressure being supplied thereto from a pump, control, and reservoir unit schematically indicated at 92. The unit 92 can be located within the base 84 or can be at a remote location, as desired.

Guide means indicated at 94 are associated with the conveyor frame 36 and the platform 86 to direct the second end of the conveyor 32 in a generally arcuate path between the stacks. The guide means 94 include a track 96 consisting of two C-shaped channels 98 and 100 which are preferably affixed to the platform 86 through brackets 102 and 104. The channels 98 and 100 have rails 106 extended therealong, as shown in FIGS. 4 and 5. Two pair of grooved wheels 108 engage the rails 106 and are mounted on axles 110. These extend through a horizontal, tubular frame member 112 of rectangular cross section, to the center of which is affixed an upright, tubular frame member 114, also of rectangular cross section. A pair of slotted, upright straps 116 are adjustably connected to the upright 114 through fasteners 118. Side walls 120 extend between the upper ends of the straps 116 with a heavy axle 122 extending through the side walls 120 and carrying rotatable sleeves 124 near the outer ends thereof.

Referring to FIG. 6, the sleeves 124 extend through elongate openings 128 formed by straps 130 and spacers 132 extending below the frame 36 of the conveyor 32. The lower extremities of the frame 36 and the width of the straps 130 are narrower than the length of the sleeves 124 to accommodate the angular positions of the frame 36 relative to the sleeves 124 as the conveyor 32 is moved between its extreme angular positions on the track 96. The frame and the straps are retained on the sleeves 124 by end collars 134. As the conveyor 32 is moved between the extreme angular positions, the sleeves 124 move back and forth in the elongate openings 128 since the track 94 is straight and the conveyor moves in an arcuate pattern. Of course, if the tracks 94 were made in an arcuate configuration, the sleeves 124 could be affixed directly to the frame 36.

A short, fixed conveyor 136 is located adjacent the first end of the conveyor 32 to receive objects from the belt 34 or to supply them onto the belt 34. The conveyor 136 includes side frames 138 which support a plurality of axles 140 (FIG. 2) on which are conveyor wheels 142. Referring to FIGS. 1 and 8, the frames 138 are mounted on brackets 144 having openings 146 through which bolts 148 extend, the bolts also extending through slots 150 located substantially the entire length of upright struts 152 supported by the frame 74. The bolts 148 extend through nuts 154 located within the struts 152 and enable the brackets 144 and the short conveyor 136 to be mounted in any desired position relative to the first end of the conveyor 32. When objects are to be received from the conveyor 32, the conveyor 136 is positioned somewhat below the first end of the conveyor 32. When the objects are to be supplied to the first end of the conveyor 32, the short conveyor 136 can be raised. The particular shape of the objects being handled can also have an influence on the height of the conveyor 136.

In the operation of the apparatus, assuming that objects are going to be removed from the stacks 22 and 24, the operator will stand on the platform 86 to the side of the second end of the conveyor 32, at which position he has access to a control panel 154 (FIG. 1) located along the side of the conveyor frame 36. This panel has suitable buttons to enable the operator to control which direction the belt 34 is driven by the motor 56 and also suitable buttons to control the power unit 92 for the lift 82. To remove the objects from the stacks, the operator raises the platform 86 to the dotted line position of FIG. 1 and then transfers the objects from the uppermost layer 26 onto the belt 34 which carries the objects down to the short conveyor 136 and onto whatever operation is being performed on the objects. At this time, the short conveyor 136 can be in a position somewhat lower than that shown in FIG. 1 to receive the object from the belt 34 without interference. As the objects of the layers 26 are removed, the operator controls the lift 82 to move the second end of the conveyor 32 downward in its generally vertical path to maintain the second end of the conveyor generally about the level of the top remaining layer 26. Since the lift 82 consumes a minimum amount of space when fully retracted as shown in FIG. 1, the second end of the conveyor 32 can be at a general level in alignment with the lowest layer 26 when that layer is the only one remaining.

When the stack 22 is gone, the operator can physically push the conveyor 32 to the second stack 24, as indicated in dotted lines in FIG. 2, with the wheels riding along the track 94. The lift 82 is then manipulated to move the conveyor 32 back to the uppermost position, as shown in dotted lines in FIG. 1, to start removing the objects in the layers 26 of the second stack 24.

When the objects are to be moved onto the pallets 28 to form the stacks 22 and 24, the above procedure is reversed.

Various modifications of the above-described embodiment of the invention will be apparent to those skilled in the art, and it is to be understood that such modifications can be made without departing from the scope of the invention, if they are within the spirit and tenor of the accompanying claims.

I claim:

1. Apparatus for handling objects comprising an elongate conveyor, means at a first end of said conveyor for pivoting said conveyor about a vertical axis, means at said first end of said conveyor for pivoting said conveyor about a horizontal axis, a platform under said conveyor toward a second end thereof, means for raising and lowering said platform, a track carried by said platform and extending transversely of said elongate conveyor, roller means engaging said track, and upright means connecting said roller means and a portion of said conveyor toward the second end to enable movement of said second end along an arcuate path having its center on the vertical axis.

2. Apparatus according to claim 1 characterized by said upright means comprises a horizontal axle, and sleeves rotatably mounted on said axle and engageable with frame means of said conveyor.

3. Apparatus according to claim 1 characterized by a horizontal conveyor positioned adjacent the first end of said elongate conveyor and means for supporting said horizontal conveyor in a plurality of vertical positions relative to said first end of said elongate conveyor.

4. Apparatus according to claim 1 characterized by said platform being sufficiently large to support an operator near the second end of said conveyor.

5. Apparatus according to claim 1 characterized by said elongate conveyor comprises a belt, a tail pulley, and a tail pulley shaft supporting said tail pulley at the first end of said conveyor, said means at the first end of said conveyor for pivoting said conveyor about the vertical axis comprises a base bearing member, an upper bearing member, and bearing means therebetween, and said means at the first end of said conveyor for pivoting said conveyor about the horizontal axis comprises a pair of upright supporting members extending upwardly from said upper bearing member and pivotally connected to said tail pulley shaft of said conveyor.

6. Apparatus according to claim 5 characterized by means for moving said belt in opposite directions.

7. Apparatus for transferring a plurality of objects to or from at least two separate stacks thereof comprising an elongate conveyor, means at a first end of said conveyor for pivoting said conveyor about a vertical axis which is approximately an equal distance from each stack, means at the first end of said conveyor for pivoting said conveyor about a horizontal axis between a lower position such that a second end of said conveyor is at a level near the bottom of the stack and an upper position in which the second end of said conveyor is at a level near the top of the stacks, a platform under said conveyor toward the second end thereof, said platform being of a size to support an operator near the second end of said conveyor, means for raising and lowering said platform, and means carried by said platform and movably supporting said conveyor near the second end thereof to enable said conveyor to pivot about the vertical axis.

8. Apparatus according to claim 7 characterized by said upright means comprises a horizontal axle, and sleeves rotatably mounted on said axle and engageable with frame means of said conveyor.

9. Apparatus according to claim 7 characterized by a horizontal conveyor positioned adjacent the first end of said elongate conveyor and means for supporting said horizontal conveyor in a plurality of vertical positions relative to said first end of said elongate conveyor.

10. Apparatus according to claim 7 characterized by said last-named means comprises a track carried by said platform, rollers engaging said track, and upright means connecting said rollers and a portion of said conveyor toward the second end.

11. Apparatus according to claim 7 characterized by said elongate conveyor comprises a conveyor belt, a tail pulley, and a tail pulley shaft supporting said tail pulley at the first end of said conveyor, said means at the first end of said conveyor for pivoting said conveyor about a vertical axis comprises a base bearing member, an upper bearing member, and bearing means therebetween, and said means at the first end of said conveyor for pivoting said conveyor about the horizontal axis comprises a pair of upright supporting members extending upwardly from said upper bearing member and pivotally connected to said tail pulley shaft of said conveyor.

12. Apparatus according to claim 11 characterized by means for moving said belt in opposite directions.

* * * * *